Jan. 3, 1928.
E. A. POHL
1,654,832
CLOSET BASIN
Filed June 18, 1927
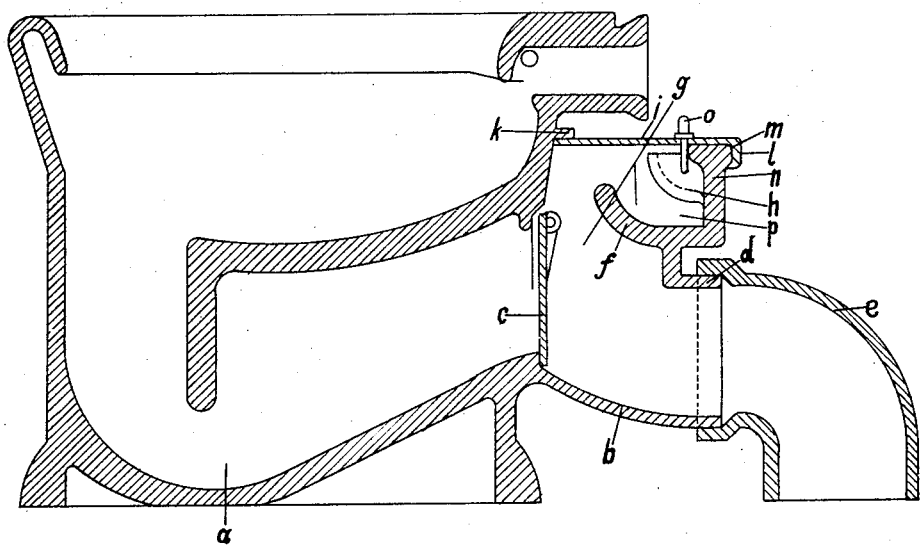
Witnesses:
Inventor:
Ernst August Pohl Patented Jan. 3, 1928.

1,654,832

UNITED STATES PATENT OFFICE.

ERNST AUGUST POHL, OF HAMBURG, GERMANY.

CLOSET BASIN.

Application filed June 18, 1927. Serial No. 199,788.

This invention relates to an improved arrangement, in a closet basin, for preventing rats entering dwellings through said basin and at the same time for exterminating said dangerous animals.

From known arrangements of similar kind, the improved arrangement is distinguished by the rear outlet end of the closet basin, that is closed toward the front end by means of a non-return flap, forming at its upper part a separate chamber for the reception of rat poison and of a bait for the rats, said chamber being fitted with a removable cover permitting an easy access thereto from outside.

The accompanying drawing illustrates, by way of example, a closet basin in a vertical longitudinal section embodying the improved arrangement.

The closet basin $a$ has as usual a rear outlet end $b$ closed toward the front end of the basin by means of a non-return flap $c$ and joined at $d$ to the branch $e$ of a waste-pipe.

Said outlet end $b$ forms at its upper part a chamber $g$ that is subdivided by means of a rib $f$, so that above the latter a separate compartment $p$ for the reception of rat poison is created. At the top and rear of said compartment a separate receptacle $h$ is arranged for the reception of a bait for the rats, said bait being so located in the receptacle that it cannot be reached by the rats.

At its upper end, the poison compartment $p$ is closed by means of a removable cover $i$, which for instance engages at the front end below a projection $k$ of the closet basin and at its hook-shaped rear end $l$ over the outwardly projecting upper edge $m$ of the rear wall $n$ of said poison compartment while a pin $o$ secures it against lateral displacement. A lifting of the cover in upward direction from inside the compartment by the rats is thereby made impossible.

Due to the particular arrangement of the bait receptacle at the top and rear of the poison compartment, the rats are always compelled to enter the latter prior to their trying to get at the bait.

What I claim, is:—

1. In a closet basin, the combination with the rear outlet end of the latter closed toward the front end by means of a non-return flap, of a separate chamber in the upper part of and accessible from said rear outlet end serving for the reception of rat poison and of a bait for the rats entering said rear outlet end, and a removable cover for said chamber.

2. In an arrangement as specified in claim 1, a separate bait receptacle at the top and rear of said chamber.

In testimony whereof I have hereunto set my hand.

ERNST AUGUST POHL.